(12) United States Patent
Lee

(10) Patent No.: US 8,116,171 B1
(45) Date of Patent: Feb. 14, 2012

(54) METHOD AND SYSTEM FOR PROVIDING ENERGY ASSISTED MAGNETIC RECORDING DISK DRIVE USING A VERTICAL SURFACE EMITTING LASER

(75) Inventor: Shing Lee, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 92 days.

(21) Appl. No.: 12/616,729

(22) Filed: Nov. 11, 2009

(51) Int. Cl.
*G11B 11/00* (2006.01)
(52) U.S. Cl. .................................... 369/13.01
(58) Field of Classification Search .................. None
See application file for complete search history.

(56) References Cited

U.S. PATENT DOCUMENTS

| | | | |
|---|---|---|---|
| 6,795,630 | B2 | 9/2004 | Challener et al. |
| 7,272,079 | B2 | 9/2007 | Challener |
| 7,365,941 | B2 * | 4/2008 | Poon et al. ............... 360/125.01 |
| 7,412,143 | B2 | 8/2008 | Rottmayer et al. |
| 7,521,137 | B2 | 4/2009 | Hohlfeld et al. |
| 7,609,480 | B2 | 10/2009 | Shukh et al. |
| 2004/0001394 | A1 * | 1/2004 | Challener et al. .......... 369/13.32 |
| 2005/0030883 | A1 | 2/2005 | Hesselink et al. |
| 2005/0031278 | A1 | 2/2005 | Shi et al. |
| 2005/0041950 | A1 * | 2/2005 | Rottmayer et al. ........... 385/147 |
| 2006/0119983 | A1 * | 6/2006 | Rausch et al. ................ 360/128 |
| 2006/0232869 | A1 | 10/2006 | Itagi et al. |
| 2007/0036040 | A1 * | 2/2007 | Mihalcea et al. .......... 369/13.14 |
| 2007/0297082 | A1 * | 12/2007 | Peng et al. ...................... 360/59 |
| 2008/0002298 | A1 | 1/2008 | Sluzewski |
| 2008/0170319 | A1 | 7/2008 | Seigler et al. |
| 2008/0218891 | A1 | 9/2008 | Gubbins et al. |
| 2009/0310459 | A1 * | 12/2009 | Gage et al. .................... 369/100 |
| 2010/0123965 | A1 * | 5/2010 | Lee et al. ......................... 360/59 |
| 2010/0328807 | A1 * | 12/2010 | Snyder et al. .................. 360/59 |

* cited by examiner

Primary Examiner — Joseph Haley
Assistant Examiner — Henok Heyi

(57) ABSTRACT

A method and system for providing an energy assisted magnetic recording (EAMR) disk drive are described. The EAMR disk drive includes a media, a slider having a trailing face, at least one EAMR head on the slider, and at least one vertical surface emitting laser (VCSEL). The VCSEL(s) includes a plurality of quantum wells and an extended resonance cavity. The VCSEL(s) provides energy to the EAMR disk drive. The extended resonance cavity extends into the slider and is oriented substantially perpendicular to the trailing face of the slider. The EAMR head(s) include grating(s), waveguide(s), a write pole, and coil(s) for energizing the write pole. At least a portion of the grating(s) reside in the extended resonance cavity and couple energy from the VCSEL to the waveguide(s). The waveguide(s) direct the energy from the grating(s) toward the media.

29 Claims, 4 Drawing Sheets

Side View

Top View

Side View

Top View

METHOD AND SYSTEM FOR PROVIDING ENERGY ASSISTED MAGNETIC RECORDING DISK DRIVE USING A VERTICAL SURFACE EMITTING LASER

BACKGROUND

FIG. 1 depicts a side view of portion of a conventional energy assisted magnetic recording (EAMR) disk drive 10. The conventional EAMR disk drive 10 includes a recording media 12, a conventional slider 20, and a conventional laser diode 30 that are typically attached to a suspension (not shown). Other components that may be part of the conventional EAMR disk drive 10 are not shown. The conventional slider 20 is typically attached to the suspension at its back side 24. A conventional EAMR transducer 22 is coupled with the slider 20.

The conventional EAMR transducer 22 includes a grating (not separately shown) on the slider 20. Light from the conventional laser diode 30 is provided substantially along the optic axis 32 of the conventional laser diode 30 to the grating of conventional EAMR transducer 22. The light from the laser diode 30 is then provided to a waveguide. The waveguide directs the light toward the conventional media 12, heating a small region of the conventional media 12. The conventional EAMR transducer 22 magnetically writes to the conventional media 12 in the region the conventional media 12 is heated.

Although the conventional EAMR disk drive 10 may function, improvements in optical efficiency may be desired. Accurately placing the conventional slider 20 and conventional laser diode 30 may be difficult. As a result, misalignments may occur. Such misalignments may increase insertion loss of the laser light due, for example to back reflections. Optical efficiency and, therefore, performance of the conventional EAMR disk drive 10 may suffer. In addition, manufacturing yield and/or manufacturing time may suffer. Further, the temperature of the conventional EAMR disk drive 10 may vary in the region of the laser 30. Such changes in temperature may change the wavelength of the light produced by the laser 30. As a result, optical efficiency of the conventional EAMR disk drive may suffer. Thus, the conventional EAMR disk drive 10 may be high in cost, have lower than desired optical efficiency, and may have manufacturability issues.

Accordingly, what is needed is a system and method for improving manufacturability and performance of an EAMR transducer.

BRIEF SUMMARY OF THE INVENTION

A method and system for providing an energy assisted magnetic recording (EAMR) disk drive are described. The EAMR disk drive includes a media, a slider having a trailing face, at least one EAMR head on the slider, and at least one vertical surface emitting laser (VCSEL). The VCSEL(s) includes a plurality of quantum wells and an extended resonance cavity. The VCSEL(s) provides energy to the EAMR disk drive. The extended resonance cavity extends into the slider and is oriented substantially perpendicular to the trailing face of the slider. The EAMR head(s) include grating(s), waveguide(s), a write pole, and coil(s) for energizing the write pole. At least a portion of the grating(s) resides in the extended resonance cavity and couple energy from the VCSEL to the waveguide(s). The waveguide(s) direct the energy from the grating(s) toward the media.

DETAILED DESCRIPTION OF THE PREFERRED EMBODIMENTS

Figure 1:
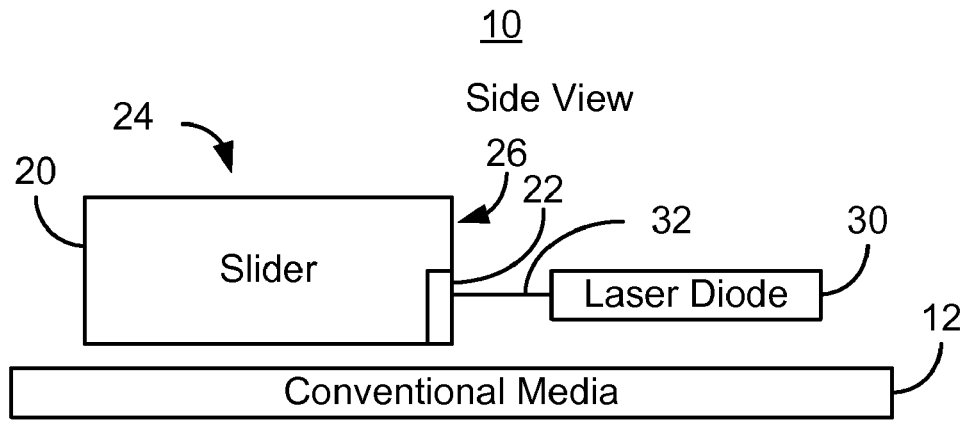
FIG. 1 depicts a side view of a conventional EAMR disk drive.
Figure 2:
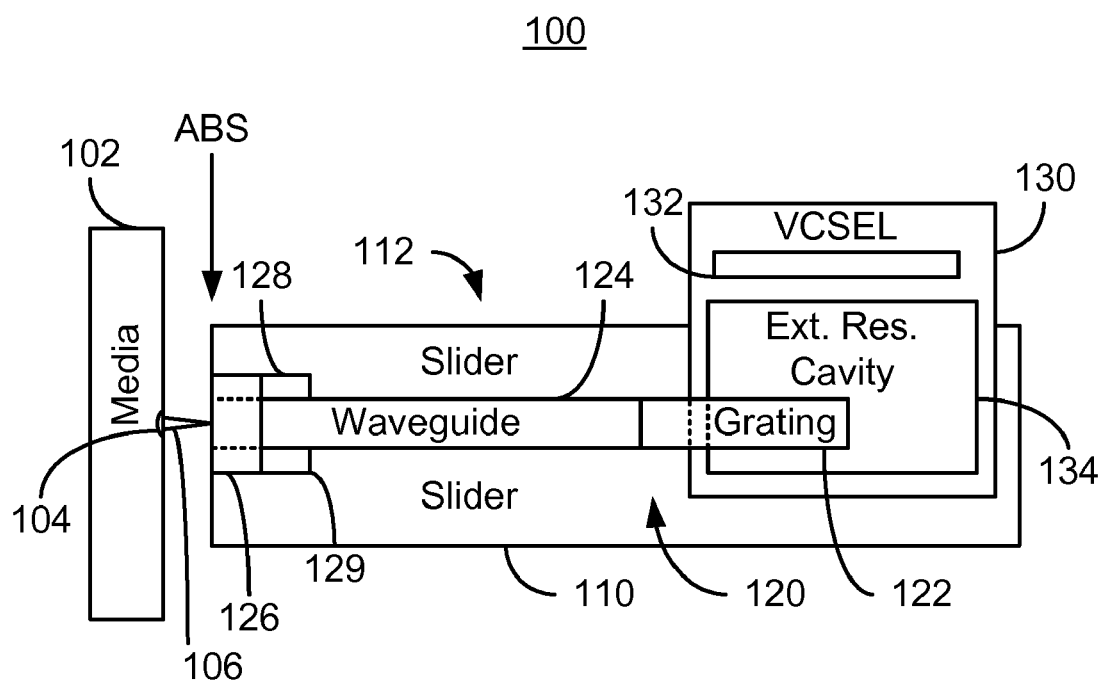
FIG. 2 depicts a side view of an exemplary embodiment of a portion of an EAMR disk drive.

FIG. 2 depicts a side view of an exemplary embodiment of a portion of an EAMR disk drive 100. The EAMR disk drive 100 includes media 102 and slider 110. For clarity, FIG. 2 is not to scale. For simplicity not all portions of the EAMR disk drive 100 are shown. In addition, although the EAMR disk drive 100 is depicted in the context of particular components other and/or different components may be used. For simplicity, only single components 110, 120, and 130 are shown. However, multiples of each components 110, 120 and/or 130 and their sub-components, might be used.

The EAMR disk drive 100 includes media 102, a slider 110 having a trailing face 112, an EAMR head 120, and a vertical surface emitting laser (VCSEL) 130. Additional and/or different components may be included in the EAMR disk drive 100. Although not shown, the slider 110, and thus the VCSEL 130 and EAMR head 120 are generally attached to a suspension (not shown). In order to write to the media 102, energy 106 from the head 120 is focused to a spot on the media. The energy 106 heats a region 104 of the media 102. The energy may be in the form of a light or other electromagnetic beam from the EAMR head 120. The heated region 106 is typically larger than the size of the optical spot developed by the energy 106 on the media 102.

The VCSEL 130 is oriented substantially perpendicular to the trailing face 112 of the slider 110 and generates the energy used in heating the media 102. In some embodiments, the VCSEL 130 is coupled with the slider 110 such that a hermetic seal is formed. The VCSEL 130 includes quantum wells 132 and extended resonance cavity 134. The quantum wells 132 and extended resonance cavity 134 allow the VCSEL to lase. The VCSEL 130 is thus the source of energy, generally laser light within the optical range of the spectrum. However, in another embodiment, the VCSEL 130 might generate energy in another portion of the spectrum. In addition to the quantum wells 132 and extended resonance cavity 134, the VCSEL 130 may include an aperture and an antireflective coating (ARC) between the grating(s) 122 and the quantum wells 132. In some embodiments, the VCSEL may also include a lens between the grating(s) 122 and the quantum wells 132. In such embodiments, the antireflective coating resides on the lens.

The VCSEL extends into the slider 110. More specifically, at least a portion of the extended resonance cavity 134 of the VCSEL 130 extends into the slider 110. In some embodiments, the extended resonance cavity 134 is oriented in a direction substantially perpendicular to the trailing face 112 of the slider 110. For example, the length of the extended resonance cavity 134 this direction may be not more than one hundred microns. In some embodiments, this length is at least fifteen and not more than sixty microns. In some embodiments, the length is at least twenty five and not more than thirty-five microns. Some sides of the extended resonance cavity 134 might also be reflective. For example, in some embodiments the extended resonance cavity 134 has mirror(s) (not shown) or other reflective surface(s) (not shown). These mirror(s) may reside opposite to the quantum wells 132 and/or opposite to the end of the grating 122. In some embodiments, a portion of the extended resonance cavity 134 is thermally conductive. As a result, the VCSEL 130 may be thermally and electrically coupled with the slider 110. Further, the VCSEL 130 in general and the extended resonance cavity 134 are configured such that the VCSEL 130 is in a single mode. This may be single mode may be maintained in various ways. For example, the single mode may be induced by a thermal lens formed by temperature gradients in the VCSEL 130, by carrier injection, by use of a lens, by use of a mirror that controls the diameter of the extended resonance cavity 134, and/or by control of the size of an aperture between the quantum wells 132 and the extended resonance cavity 134.

The EAMR head 120 resides on the slider 110. In general, the EAMR head 120 includes a write transducer and a read transducer. However, for clarity, only the write portion of the EAMR head 120 is shown. The EAMR head 120 includes at least one grating 122, at least one waveguide 124, one or more write poles 126, and at least one coil 128 for energizing the write pole(s) 126. As can be seen in FIG. 2, at least a portion of the grating(s) 122 reside in the extended resonance cavity 134. In some embodiments, all of the grating(s) 122 are in the extended resonance cavity 134. The grating(s) 122 couple energy from the VCSEL 130 to the waveguide(s) 124. In some embodiments, the grating(s) 122 couple energy traveling in a direction substantially perpendicular to a transmission direction of the energy from the quantum wells 132 to the grating(s) 122.

The waveguide 124 directs the energy from the grating(s) toward the media 102. In the embodiment shown, the waveguide(s) 124 are external to the extended resonance cavity 134. In other embodiments, a portion of the waveguide(s) 124 resides in the extended resonance cavity 134.

In operation, the optical energy is sourced in the quantum wells 132 and developed in the extended resonance cavity 134 of the VCSEL 130. The energy in the extended resonance cavity 134 is coupled to the grating 122. Energy from the grating 122 is redirected by the waveguide 124 to the ABS. If a near-field transducer (NFT), which is not shown in FIG. 2, is used, the waveguide 124 may be optically coupled with the NFT. The NFT or waveguide 124 focuses the energy onto the media 102. The energy from the VCSEL 130, shown by the beam 106, thus forms an optical spot on the media 102. The energy heats the media 102, forming thermal spot 104. The pole(s) 126 may be energized by coils 128 and 129 to write data within the thermal spot 104 of the media 102.

Using the EAMR disk drive 100, performance may be enhanced while costs are reduced. The VCSEL 130 may be capable of reliably providing a relatively high power at a lower cost. For example, the VCSEL 130 may be a thirty through eight hundred milliwatt laser having a length of not more than one hundred micrometers. The VCSEL 130 may also be configured to operate in a single transverse mode. Thus, the VCSEL 130 may output a high energy, which translates into more energy to the media 102. Further, the conversion efficiency of the grating 122 may be high. In some embodiments, energy not scattered by the grating 122 may be reflected within and feedback through the extended resonance cavity 134. Stated differently, the majority of the energy within the extended resonance cavity 134 is either coupled out through the grating 122 or remains in the cavity to continue lasing of the VCSEL 130. Thus, the conversion efficiency of the EAMR disk drive 100 may be high. The VCSEL 130 may be thermally stable. More specifically, the VCSEL 130 may exhibit small changes in wavelength with changes in temperatures. As a result, the VCSEL 130 remains within the desired wavelength range for functioning of the grating 122, waveguide 124, and/or other optics. Reduced insertion loss and improved coupling efficiency may be achieved. The VCSEL 130 may be thermally coupled to the slider 110. Consequently, the slider 110 may function as a heat sink. Further, mounting the VCSEL 130 on the slider 110 may be accomplished using wafer level integration. Thus, a high degree of precision in alignment is possible. Further, the VCSEL 130 does not require a cleaving process to form the output facet. Such a process may generate defects that can be a main cause of failure in conventional lasers. Thus, higher manufacturing volume, higher yield, improved reliability of the VCSEL 130, and lower production cost may be achieved. In addition, the bonding of the VCSEL 130 to the slider 110 may result in a seal being formed between the slider 110 and the interior of the VCSEL 130. Because the extended resonance cavity 134 may be sealed, reliability of the VCSEL 102 may be enhanced.

Figure 3:
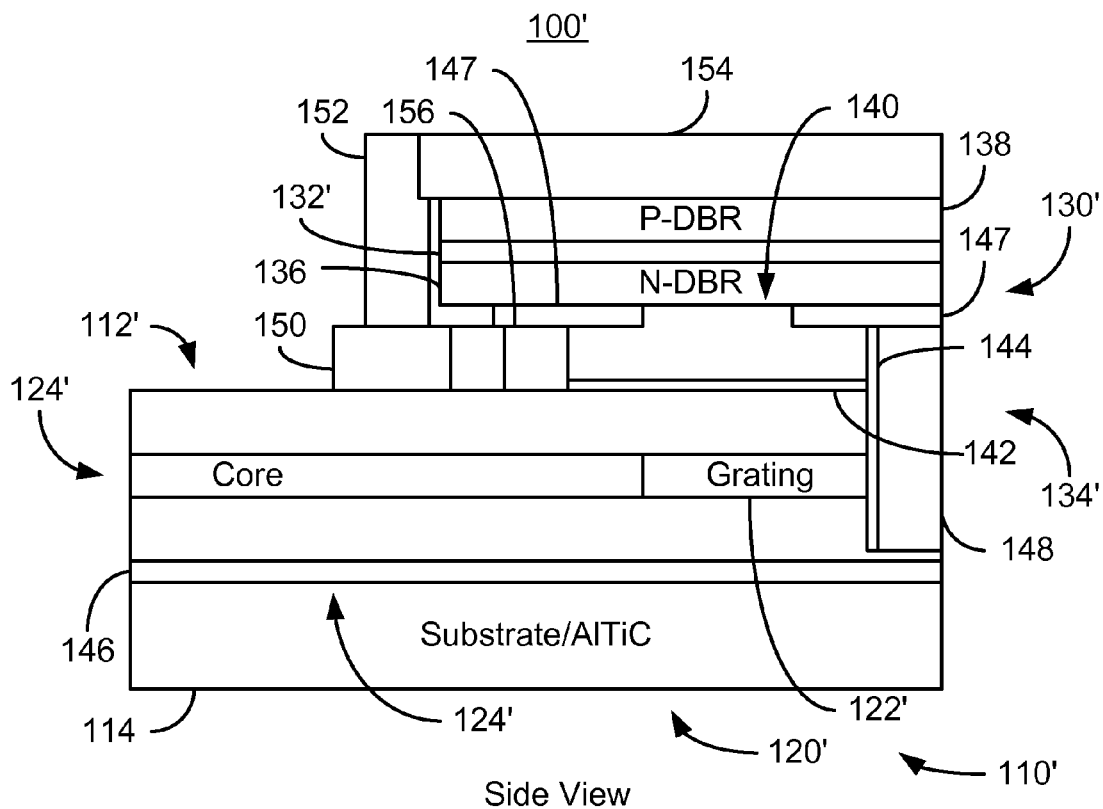
FIG. 3 depicts top and side views of an exemplary embodiment of a portion of an EAMR disk drive.
Figure 3:
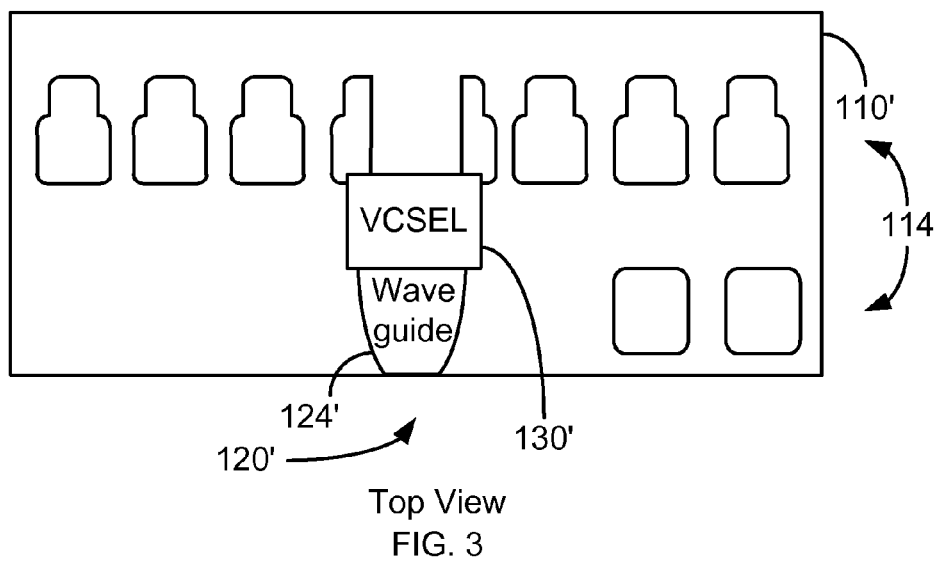

FIG. 3 depicts top and side views of an exemplary embodiment of a portion of an EAMR disk drive 100'. FIG. 3 is not to scale. Although the EAMR disk drive 100' is depicted in the context of particular components additional, other and/or different components may be used. Referring to FIGS. 2-3, the EAMR disk drive 100' is analogous to the EAMR disk drive 100. Consequently, the EAMR disk drive 100' includes a slider 110', a head 120', and a VCSEL 130' that are analogous to the slider 110, EAMR head 120, and VCSEL 130, respectively. For clarity, only a portion of the EAMR disk drive 100' is shown. For example, only the grating 122' and waveguide 124' of the EAMR head 120' are shown. Similarly, media 102, spot 104, and the suspension to which the slider 110' is generally attached are not depicted.

The slider 110' includes trailing face 112' and has contacts 114. Coupled with the slider 110' is VCSEL 130'. The VCSEL 130' is oriented substantially perpendicular to the trailing face 112' of the slider 110'. The VCSEL 130' includes quantum wells 132' and extended resonance cavity 134'. In addition, the VCSEL 130' also has N-distributed Bragg reflector (DBR) 136 and P-DBR 138, aperture 140 in oxide 147, antireflective coating (ARC) 142 between the quantum wells 132' and the grating 122' (described below), mirrors 144, and 146, portions 148, 150, 152, and 154 which enclose the VCSEL 130'. In some embodiments, the VCSEL 130' is coupled with the slider 110' such that a hermetic seal is formed by components of the VCSEL 130', such as the portions 148, 150, and 152. Further, contact 156 is shown.

The quantum wells 132' generate energy, which passes through the aperture 140 to the extended resonance cavity 132'. In some embodiments, the aperture 140 is approximately 0.1 micron in diameter. To reduce reflections, the ARC layer 142 is provided within the extended resonance cavity 134'. In some embodiments, energy from the quantum wells 132' travels, at least to a certain extent, perpendicular to the trailing face 112' of the slider 110'. In the embodiments shown, therefore, the extended resonance cavity 134' of the VCSEL 130' extends into the slider 110' in a direction substantially perpendicular to the trailing face 112' of the slider 110'. For example, the length of the extended resonance cavity 134' a direction perpendicular to the trailing face 112' of the slider 112' may be not more than one hundred microns. In some embodiments, this length is at least fifteen and not more than sixty microns. In some such embodiments, the length is at least twenty five and not more than thirty-five microns.

Also provided in the extended resonance cavity 134' are mirrors 144 and 146. Mirror 146 resides in the extended resonance cavity 134 opposite to the quantum wells 132' and the reflective N-DBR 136 and P-DBR 138. The mirror 146 is desired to be highly reflective. Thus, energy from the quantum wells 132' that might otherwise be absorbed by the substrate 101 or otherwise lost is reflected by the mirror 146 and DBRs 136 and 138 and recirculated in the extended resonance cavity 134'. Similarly, the mirror 144 is configured to reflect energy traveling substantially parallel to the trailing face 112' of the slider 110'. In some embodiments, the mirror 144 may be replaced by a grating. As discussed previously, the grating 122' may be configured to couple energy traveling toward the left in FIG. 2. Thus, energy not coupled by the grating 122' may be reflected by the mirror 144 and recirculated in the extended resonance cavity 134'. Without the mirror 144, a greater portion of the energy may be absorbed or otherwise lost by the region 148.

In some embodiments, a portion of the extended resonance cavity 134' is thermally conductive. As a result, the VCSEL 130' may be thermally and electrically coupled with the slider 110'. For example, the region 148 extends from the N-DBR 136' to the substrate 101. The region 148 may have a higher thermal conductivity. Thus, the slider 110' may act as a heat sink for the VCSEL 130.

Further, the VCSEL 130' in general and the extended resonance cavity 134' in particular are configured such that the VCSEL 130' is in a single mode. This may be single mode may be maintained in various ways. For example, the single mode may be induced by a thermal lens formed by temperature gradients in the VCSEL 130', particularly in the extended cavity 134'. Alternatively, the single mode might be maintained by some combination of the thermal lens, carrier injection at the quantum wells 122', the size of the mirror 146, and/or control of the size of the aperture 140. For example, the size of the mirror 146 in the plane perpendicular to the plane of the page may be used to control the diameter of the extended resonance cavity 134' and thus the mode of the VCSEL 130'.

Also shown in FIG. 3 is a portion of the EAMR head 120' residing on the slider 110'. The EAMR head 120' includes grating 122', waveguide 124' having core 126, one or more write poles (not shown), at least one coil (not shown) for energizing the write pole(s), as well as other components. The entire grating 122' and part of the waveguide 124' reside in the extended resonance cavity 134'. The grating 122' couples energy from the extended resonance cavity 134' to the waveguide 124'. In the embodiment shown, the grating 122' couples energy traveling in a direction substantially perpendicular to a transmission direction of the energy from the quantum wells 132' to the grating 122' (toward the left in FIG. 3). The waveguide 124' directs the energy from the grating 122' toward the media. In the embodiment shown, a portion the waveguide 124' is internal to the extended resonance cavity 134'. In other embodiments, all of the waveguide 124' may reside external to the extended resonance cavity 134'.

The EAMR disk drive 100' operates in substantially the same manner as the EAMR disk drive 100. Using the EAMR disk drive 100', therefore, performance may be enhanced while costs are reduced. More specifically, the EAMR disk drive 100' is configured such that the VCSEL 130' may be used as a higher power, single mode, thermally stable, reliable, lower cost energy source. The extended resonance cavity 134' having mirrors 144 and 146 as well as the grating 122' therein allows for a high conversion efficiency, reduced insertion loss and improved coupling efficiency. The VCSEL 130' may be heat sinked to the substrate 101 of the slider 110'. Further, mounting the VCSEL 130' on the slider 110' may be accomplished using wafer level integration. Thus, higher manufacturing volume, improved alignment, improved reliability and lower production cost may be achieved. Bonding of the VCSEL 130 to the slider 110 may result in a hermetically sealed extended resonance cavity 134, which may improve the reliability of the VCSEL 130'. Thus, performance, cost, and reliability of the EAMR disk drive 100' may be improved.

Figure 4:
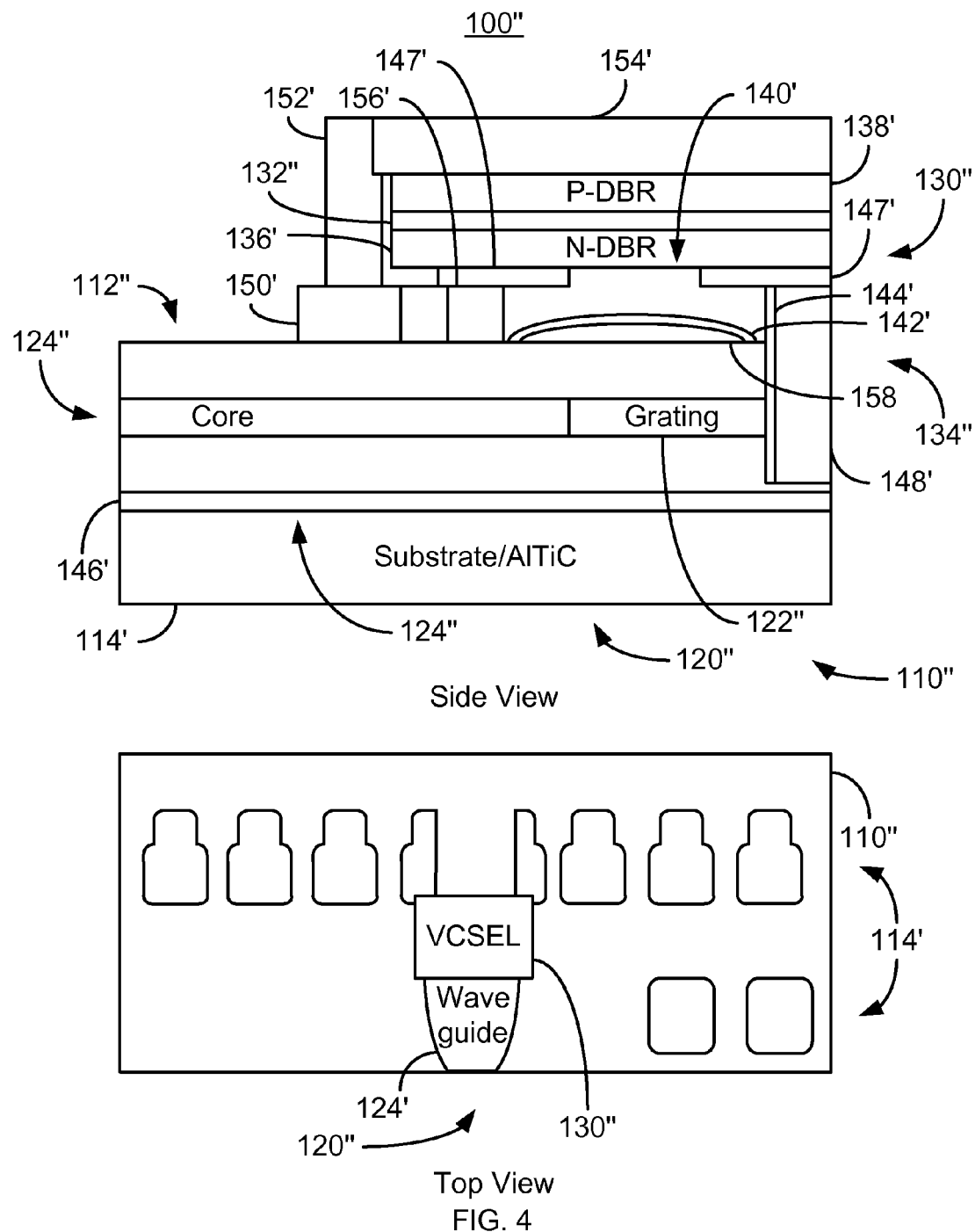
FIG. 4 depicts top and side views of an exemplary embodiment of a portion of an EAMR disk drive.

FIG. 4 depicts top and side views of an exemplary embodiment of a portion of an EAMR disk drive 100". FIG. 4 is not to scale. For clarity, only a portion of the EAMR disk drive 100" is shown. Although the EAMR disk drive 100" is depicted in the context of particular components additional, other and/or different components may be used. Referring to FIGS. 2-4, the EAMR disk drive 100" is analogous to the EAMR disk drives 100 and 100'. Consequently, the EAMR disk drive 100" includes a slider 110", a head 120", and a VCSEL 130" that are analogous to the slider 110/110', EAMR head 120/120', and VCSEL 130/130', respectively. Thus, the slider trailing face 112", the quantum wells 132", the extended resonance cavity 134", N-DBR 136', P-DBR 138', aperture 140', ARC 142', mirrors 144' and 146', portions 148', 150', 152', and 154' of the extended resonance cavity 134', grating 122" and waveguide 124" having core 126' correspond to the slider trailing face 112, the quantum wells 132, the extended resonance cavity 134, N-DBR 136, P-DBR 138, aperture 140, ARC 142, mirrors 144 and 146, portions 148, 150, 152, and 154 of the extended resonance cavity 134, grating 122 and waveguide 124 having core 126, respectively.

The EAMR disk drive 100" includes analogous components to the EAMR disk drives 100/100'. The EAMR disk drive 100" also functions in an analogous manner as the EAMR disk drives 100 and 100'. Thus, the benefits of the EAMR disk drives 100/100' may be achieved. In addition, the EAMR disk drive 100" includes lens 158 within the extended resonance cavity 134". The ARC 142' resides on the lens 158. The lens 158 collimates light from the quantum wells 132". The lens 158 may also be used by itself or in combination with the thermal lens described above, the aperture 140', quantum wells 132", the ARC 142', the mirror 146', and/or other portions of the disk drive 100' to ensure that the VCSEL 130" is in a single mode. The lens 152 may also focus the energy from the quantum wells 132". Thus, performance of the EAMR disk drive may be enhanced.

Figure 5:
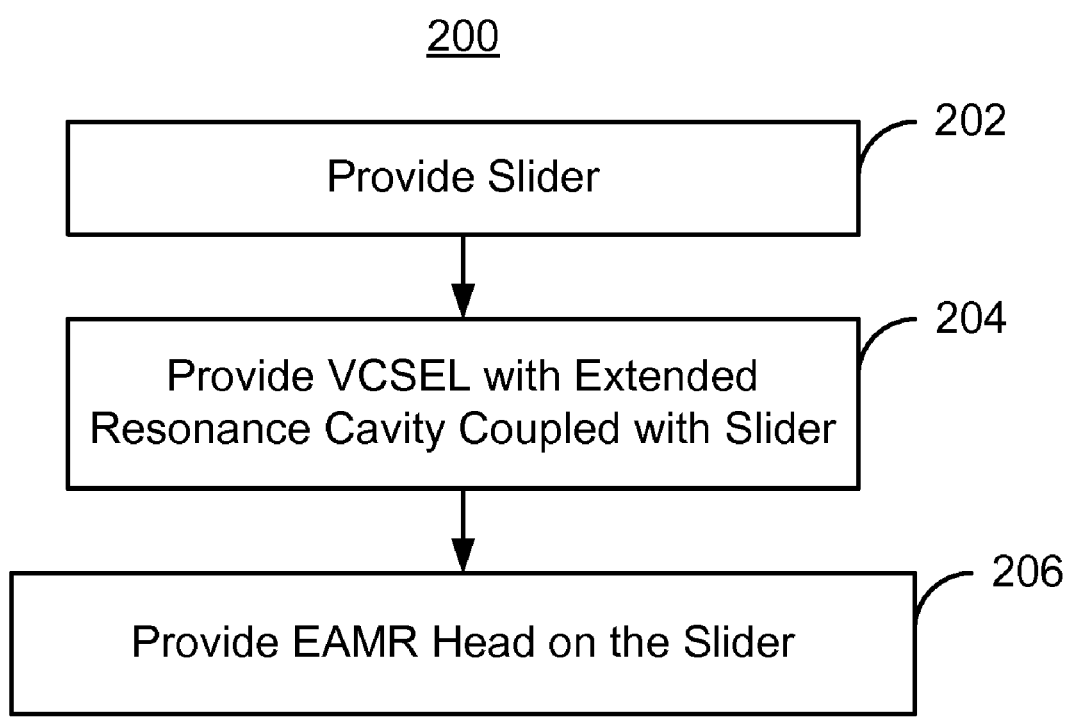
FIG. 5 depicts an exemplary embodiment of a method of forming a portion of an EAMR disk drive.

FIG. 5 depicts an exemplary embodiment of a method 200 of forming a portion of an EAMR disk drive. For simplicity, some steps may be omitted, combined, replaced, performed in another sequence, and/or interleaved. The method 200 is described in the context of the EAMR disk drives 100/100'/100". However, the method 200 may be used for other EAMR disk drives. The method 200 also may commence after formation of some portions of the EAMR disk drive 100/100'/100". The method 200 is also described in the context of providing a single disk drive. However, the method 200 may be used to fabricate multiple disk drives at substantially the same time.

The slider 110/110'/110" is provided, via step 202. Step 202 may include preparing the trailing face 112' for bonding of the VCSEL 130/130'/130".

The VCSEL 130/130'/130" is provided, via step 204. The VCSEL 130/130'/130" includes quantum wells 132/132'/132" and an extended resonance cavity 134/134'/134". Step 204 may include preparing portions of the VCSEL 130/130'/130", such as the portions 148/148' that form the extended resonance cavity 134/134'/134", inspecting portions of the VCSEL 130/130'/130", and then bonding portions of the VCSEL 130/130'/130", such as the quantum wells 132/132'/132", the N-DBR 136/136' and the P-DBR 138/138'.

The EAMR head 120/120'/120" is provided on the slider 110/110'/110", via step 206. In some embodiments, step 206 includes multiple substeps. These substeps form the components of the EAMR head 120/120'/120", for example using photolithography or other means. Thus, the waveguide 124/124'/124", the grating 122/122'/122", pole(s), shield(s), and coil(s) may be formed.

Thus, using the method 200, the disk drives 100/100'/100" may be provided. As a result, the benefits of the disk drives 100/100'/100" may be achieved.

I claim:

1. An energy assisted magnetic recording (EAMR) disk drive including a media comprising:
   a slider having a trailing face;
   at least one vertical surface emitting laser (VCSEL) including a plurality of quantum wells and an extended resonance cavity, the at least one VCSEL for providing energy to the EAMR disk drive, the extended resonance cavity extending into the slider and oriented substantially perpendicular to the trailing face of the slider, the extended resonance cavity and the plurality of quantum wells allowing the at least one VCSEL to lase; and
   at least one EAMR head on the slider, the at least one EAMR head including at least one grating, at least one waveguide, a write pole, and at least one coil for energizing the write pole, at least a portion of the at least one grating residing in the extended resonance cavity and coupling energy from the VCSEL to the at least one waveguide, the at least one waveguide directing the energy from the at least one grating toward the media.

2. The EAMR disk drive of claim 1 wherein a portion of the at least one waveguide resides in the extended resonance cavity.

3. The EAMR disk drive of claim 1 wherein the extended resonance cavity further includes a mirror opposite to the plurality of quantum wells.

4. The EAMR disk drive of claim 1 wherein the VCSEL further includes an antireflective coating between the at least one grating and the plurality of quantum wells.

5. The EAMR disk drive of claim 4 wherein the VCSEL further includes a lens between the at least one grating and the plurality of quantum wells, the antireflective coating being on the lens.

6. The EAMR disk drive of claim 1 wherein the at least one grating couples a portion of the energy traveling in a direction substantially perpendicular to a transmission direction of the energy from the plurality of quantum wells to the at least one grating.

7. The EAMR disk drive of claim 6 wherein all of the at least one grating is in the extended resonance cavity.

8. The EAMR disk drive of claim 1 wherein the VCSEL further includes an aperture between the plurality of quantum wells and the extended resonance cavity.

9. The EAMR disk drive of claim 1 wherein the slider includes a substrate and wherein a thermally conductive portion of the extended resonance cavity extends from the VCSEL to the substrate such that the VCSEL is thermally and electrically coupled with the slider.

10. The EAMR disk drive of claim 1 wherein the VCSEL is coupled with the slider such that a hermetic seal is formed.

11. An energy assisted magnetic recording (EAMR) disk drive including a media comprising:
    a slider having a trailing face;
    at least one vertical surface emitting laser (VCSEL) including a plurality of quantum wells and an extended resonance cavity, the at least one VCSEL for providing energy to the EAMR disk drive, the extended resonance cavity extending into the slider and oriented substantially perpendicular to the trailing face of the slider; and
    at least one EAMR head on the slider, the at least one EAMR head including at least one grating, at least one waveguide, a write pole, and at least one coil for energizing the write pole, at least a portion of the at least one grating residing in the extended resonance cavity and coupling energy from the VCSEL to the at least one waveguide, the at least one waveguide directing the energy from the at least one grating toward the media;
    wherein the extended resonance cavity has a length substantially perpendicular to the trailing face of the slider, the length being not more than one hundred microns.

12. The EAMR disk drive of claim 11 wherein the length is at least fifteen and not more than sixty microns.

13. The EAMR disk drive of claim 12 wherein the length is at least twenty five and not more than thirty-five microns.

14. The EAMR disk drive of claim 1 wherein the extended resonance cavity includes a mirror oriented substantially perpendicular to the trailing face of the slider and opposite to the at least one grating.

15. The EAMR disk drive of claim 1 wherein the VCSEL and the extended resonance cavity are configured such that the VCSEL is in a single mode, the single mode being at least one of a thermal lens induced single mode, a carrier injection induced single mode, a lens induced single mode, a mirror induced single mode, and an aperture size induced single mode.

16. An energy assisted magnetic recording (EAMR) disk drive including a media comprising:
    a slider having a trailing face and a substrate,
    at least one vertical surface emitting laser (VCSEL) coupled with the slider, the VCSEL including a plurality of quantum wells, an aperture, a lens, and an extended resonance cavity, the at least one VCSEL for providing energy to the EAMR disk drive, the extended resonance cavity extending into the slider and being oriented substantially perpendicular to the trailing face of the slider, the extended resonance cavity having length substantially perpendicular to the trailing face of the slider, the length being at least twenty microns and not more than sixty microns, the aperture being between the lens and the plurality of quantum wells, the lens residing between the aperture and the extended resonance cavity, the lens including an antireflective coating, the extended resonance cavity having a first mirror opposite to the lens and a second mirror, the first mirror being substantially parallel to the trailing face of the slider, the extended resonance cavity being configured such that the VCSEL is in a single mode, the single mode being at least one of a thermal lens induced single mode, a carrier injection induced single mode, a lens induced single mode, a mirror induced single mode, and an aperture size induced single mode;
    an EAMR head on the slider, the EAMR head including a grating, a waveguide, a write pole, and at least one coil for energizing the write pole, the grating residing in the extended resonance cavity and coupling energy from the VCSEL to the waveguide, the waveguide directing the energy from the grating toward the media, the write pole for magnetically writing data to the media, the grating coupling a portion of the energy traveling in a direction substantially perpendicular to a transmission direction of the energy from the plurality of quantum wells to the grating, the second mirror being substantially perpendicular to the trailing face of the slider and opposite to the grating, the second mirror being coupled to a thermally conductive portion of the extended resonance cavity that extends to the substrate.

17. A method for providing an energy assisted magnetic recording (EAMR) disk drive including a media, the method comprising:
providing a slider having a trailing face;
providing at least one vertical surface emitting laser (VCSEL) including a plurality of quantum wells and an extended resonance cavity, the at least one VCSEL for providing energy to the EAMR disk drive, the extended resonance cavity extending into the slider and oriented substantially perpendicular to the trailing face of the slider, the extended resonance cavity and the plurality of quantum wells allowing the at least one VCSEL to lase; and
providing at least one EAMR head on the slider, the at least one EAMR head including at least one grating, at least one waveguide, a write pole, and at least one coil for energizing the write pole, at least a portion of the at least one grating residing in the extended resonance cavity and coupling energy from the VCSEL to the at least one waveguide, the at least one waveguide directing the energy from the at least one grating toward the media.

18. The method of claim 17 wherein a portion of the at least one waveguide resides in the extended resonance cavity.

19. The method of claim 17 wherein the extended resonance cavity further includes a mirror opposite to the plurality of quantum wells.

20. The method of claim 17 further wherein the step of providing the VCSEL further includes:
providing an antireflective coating between the at least one grating and the plurality of quantum wells.

21. The method of claim 20 wherein the step of providing the VCSEL further includes:
providing a lens between the at least one grating and the plurality of quantum wells, the antireflective coating being on the lens.

22. The method of claim 17 wherein the at least one grating couples a portion of the energy traveling in a direction substantially perpendicular to a transmission direction of the energy from the plurality of quantum wells to the at least one grating.

23. The method of claim 22 wherein all of the at least one grating is in the extended resonance cavity.

24. The method of claim 17 wherein the slider includes a substrate and wherein a thermally conductive portion of the extended resonance cavity extends from the VCSEL to the substrate such that the VCSEL is thermally and electrically coupled with the slider.

25. The method of claim 17 wherein the step of providing the VCSEL further includes:
coupling the VCSEL with the slider such that a hermetic seal is formed.

26. A method for providing an energy assisted magnetic recording (EAMR) disk drive including a media, the method comprising:
providing a slider having a trailing face;
providing at least one vertical surface emitting laser (VCSEL) including a plurality of quantum wells and an extended resonance cavity, the at least one VCSEL for providing energy to the EAMR disk drive, the extended resonance cavity extending into the slider and oriented substantially perpendicular to the trailing face of the slider; and
providing at least one EAMR head on the slider, the at least one EAMR head including at least one grating, at least one waveguide, a write pole, and at least one coil for energizing the write pole, at least a portion of the at least one grating residing in the extended resonance cavity and coupling energy from the VCSEL to the at least one waveguide, the at least one waveguide directing the energy from the at least one grating toward the media;
wherein the extended resonance cavity has a length substantially perpendicular to the trailing face of the slider, the length being not more than one hundred microns.

27. The method of claim 26 wherein the length is at least fifteen and not more than sixty microns.

28. The method of claim 17 wherein the extended resonance cavity includes a mirror oriented substantially perpendicular to the trailing face of the slider and opposite to the at least one grating.

29. The method of claim 17 wherein the VCSEL and the extended resonance cavity are configured such that the VCSEL is in a single mode, the single mode being at least one of a thermal lens induced single mode, a carrier injection induced single mode, a lens induced single mode, a mirror induced single mode, and an aperture size induced single mode.

* * * * *